(12) United States Patent
Brereton et al.

(10) Patent No.: US 8,770,604 B2
(45) Date of Patent: Jul. 8, 2014

(54) SUSPENSION TRAILING ARM

(75) Inventors: Garry Brereton, Rossett (GB); David Chan, Flintshire (GB)

(73) Assignee: Meritor Heavy Vehicle Systems Limited, Clwyd (GB)

( * ) Notice: Subject to any disclaimer, the term of this patent is extended or adjusted under 35 U.S.C. 154(b) by 2837 days.

(21) Appl. No.: 10/538,816

(22) PCT Filed: Dec. 15, 2003

(86) PCT No.: PCT/GB03/05452
§ 371 (c)(1),
(2), (4) Date: Jan. 17, 2006

(87) PCT Pub. No.: WO2004/054825
PCT Pub. Date: Jul. 1, 2004

(65) Prior Publication Data
US 2006/0163834 A1 Jul. 27, 2006

(30) Foreign Application Priority Data

Dec. 13, 2002 (GB) .................................. 0229056.7

(51) Int. Cl.
*B60G 3/12* (2006.01)
(52) U.S. Cl.
USPC ....... 280/124.128; 280/124.108; 280/124.116
(58) Field of Classification Search
USPC ..................... 280/124.116, 124.108, 124.128
See application file for complete search history.

(56) References Cited

U.S. PATENT DOCUMENTS

| | | |
|---|---|---|
| 1,325,832 A | 12/1919 | Coburn |
| 1,987,791 A | 1/1935 | Opolo |
| 2,011,239 A | 8/1935 | Christman |
| 2,163,981 A | 6/1939 | Lawrence |
| 2,181,546 A | 11/1939 | Bradshaw |
| 2,606,036 A | 8/1952 | Collender |
| 2,635,896 A | 4/1953 | Tantlinger |
| 2,877,010 A | 3/1959 | Gouirand |
| 2,913,252 A | 11/1959 | Norrie |
| 2,993,707 A | 7/1961 | Vaugoyeau |
| 3,140,880 A | 7/1964 | Masser |
| 3,434,707 A | 3/1969 | Raidel |
| 3,490,786 A | 1/1970 | Ravenel |
| 3,547,215 A | 12/1970 | Bird |
| 3,594,017 A | 7/1971 | Grosseau |
| 3,630,541 A | 12/1971 | Carlson |
| 3,707,298 A | 12/1972 | Henry et al. |
| 3,751,066 A * | 8/1973 | Narahari ..................... 280/86.5 |

(Continued)

FOREIGN PATENT DOCUMENTS

| | | |
|---|---|---|
| DE | 1 933 469 | 1/1971 |
| DE | 31 19 022 | 12/1982 |

(Continued)

OTHER PUBLICATIONS

Daytonair Truckmaster Suspension Brochure (Prior Art).

(Continued)

*Primary Examiner* — Ruth Ilan
*Assistant Examiner* — Timothy Wilhelm
(74) *Attorney, Agent, or Firm* — Brooks Kushman P.C.

(57) ABSTRACT

A cast or forged suspension trailing arm for suspending a heavy vehicle chassis from a beam-type axle includes an integral axle locating feature.

10 Claims, 13 Drawing Sheets

(56) References Cited

U.S. PATENT DOCUMENTS

| | | | |
|---|---|---|---|
| 3,771,812 A | 11/1973 | Pierce et al. | |
| 3,785,673 A | 1/1974 | Harbers, Jr. et al. | |
| 3,802,718 A | 4/1974 | Schaeff | |
| 3,961,826 A | 6/1976 | Sweet et al. | |
| 4,027,898 A | 6/1977 | Steen | |
| 4,061,362 A | 12/1977 | Bufler | |
| 4,065,153 A | 12/1977 | Pringle | |
| 4,152,011 A | 5/1979 | Sano et al. | |
| 4,166,640 A | 9/1979 | Van Denberg | |
| 4,174,855 A | 11/1979 | Vandenberg | |
| 4,293,145 A | 10/1981 | Taylor | |
| 4,310,171 A | 1/1982 | Merkle | |
| 4,352,509 A | 10/1982 | Paton et al. | |
| 4,371,190 A | 2/1983 | Vandenberg | |
| 4,415,179 A | 11/1983 | Marinelli | |
| 4,427,213 A | 1/1984 | Raidel, Jr. | |
| 4,494,771 A | 1/1985 | Raidel | |
| 4,504,080 A | 3/1985 | VanDenberg | |
| 4,529,224 A | 7/1985 | Raidel | |
| 4,537,420 A | 8/1985 | Ito et al. | |
| 4,541,643 A | 9/1985 | Pavincic | |
| 4,566,719 A | 1/1986 | Van Denberg | |
| 4,691,937 A | 9/1987 | Raidel | |
| 4,693,486 A | 9/1987 | Pierce et al. | |
| 4,722,549 A | 2/1988 | Raidel | |
| 4,763,923 A | 8/1988 | Raidel | |
| 4,787,680 A | 11/1988 | Bonjean et al. | |
| 4,858,949 A * | 8/1989 | Wallace et al. | 280/124.116 |
| 4,878,691 A | 11/1989 | Cooper et al. | |
| 4,902,035 A | 2/1990 | Raidel | |
| 4,943,081 A | 7/1990 | Golpe | |
| 4,991,868 A | 2/1991 | VanDenberg | |
| 5,002,305 A | 3/1991 | Raidel | |
| 5,029,885 A | 7/1991 | Steiner | |
| 5,037,126 A | 8/1991 | Gottschalk et al. | |
| 5,058,916 A | 10/1991 | Hicks | |
| 5,112,078 A | 5/1992 | Galazin et al. | |
| 5,127,668 A | 7/1992 | Raidel | |
| 5,171,036 A | 12/1992 | Ross | |
| 5,203,585 A * | 4/1993 | Pierce | 280/124.116 |
| 5,366,237 A * | 11/1994 | Dilling et al. | 280/124.116 |
| 5,375,871 A | 12/1994 | Mitchell et al. | |
| 5,403,031 A | 4/1995 | Gottschalk et al. | |
| 5,443,280 A | 8/1995 | Kawaguchi et al. | |
| 5,464,245 A | 11/1995 | Vogler | |
| 5,639,110 A | 6/1997 | Pierce et al. | |
| 5,658,005 A | 8/1997 | Kleinschmit et al. | |
| 5,690,353 A | 11/1997 | Vandenberg | |
| 5,720,489 A | 2/1998 | Pierce et al. | |
| 5,785,345 A | 7/1998 | Barlas et al. | |
| 5,800,024 A | 9/1998 | Steimmel et al. | |
| 5,810,377 A | 9/1998 | Keeler et al. | |
| 5,887,881 A | 3/1999 | Hatch | |
| 5,921,570 A | 7/1999 | Lie | |
| 5,938,221 A | 8/1999 | Wilson | |
| 5,944,339 A | 8/1999 | McKenzie et al. | |
| 5,950,971 A | 9/1999 | Koumbis et al. | |
| 5,954,351 A | 9/1999 | Koschinat | |
| 5,988,672 A | 11/1999 | VanDenberg | |
| 5,996,981 A | 12/1999 | Dilling | |
| 6,022,035 A * | 2/2000 | Habich | 280/124.128 |
| 6,039,336 A * | 3/2000 | Frey | 280/124.128 |
| 6,062,578 A | 5/2000 | Richardson | |
| 6,073,946 A | 6/2000 | Richardson | |
| 6,074,016 A | 6/2000 | Blondelet et al. | |
| 6,123,349 A | 9/2000 | Depue | |
| 6,129,367 A | 10/2000 | Bublies et al. | |
| 6,209,895 B1 | 4/2001 | Mueller et al. | |
| 6,264,231 B1 | 7/2001 | Scully | |
| 6,425,593 B2 * | 7/2002 | Fabris et al. | 280/104 |
| 6,471,223 B1 * | 10/2002 | Richardson | 280/86.5 |
| 6,491,314 B2 * | 12/2002 | Smith et al. | 280/124.116 |
| 6,508,482 B2 * | 1/2003 | Pierce et al. | 280/124.116 |
| 6,557,875 B2 * | 5/2003 | Schlosser et al. | 280/124.153 |
| 6,672,604 B2 * | 1/2004 | Eveley | 280/124.128 |
| 6,733,020 B2 * | 5/2004 | Reineck | 280/124.107 |
| 6,851,689 B2 * | 2/2005 | Dudding et al. | 280/124.128 |
| 7,007,960 B2 * | 3/2006 | Chalin et al. | 280/124.116 |
| 7,347,435 B2 * | 3/2008 | Chalin | 280/124.116 |
| 2001/0020775 A1* | 9/2001 | Pierce et al. | 280/124.128 |
| 2001/0035622 A1* | 11/2001 | Fabris et al. | 280/104 |
| 2002/0117829 A1* | 8/2002 | Platner | 280/124.13 |
| 2003/0146592 A1* | 8/2003 | Chalin et al. | 280/124.116 |
| 2004/0051268 A1* | 3/2004 | Chan et al. | 280/124.1 |
| 2004/0256829 A1* | 12/2004 | Chalin et al. | 280/124.116 |
| 2005/0051986 A1* | 3/2005 | Galazin et al. | 280/124.116 |
| 2005/0082783 A1* | 4/2005 | Ramsey et al. | 280/124.128 |
| 2006/0033304 A1* | 2/2006 | Saieg et al. | 280/124.128 |
| 2006/0237939 A1* | 10/2006 | Hicks | 280/124.116 |
| 2007/0158924 A1* | 7/2007 | Peaker et al. | 280/124.116 |

FOREIGN PATENT DOCUMENTS

| | | |
|---|---|---|
| DE | 29718751 | 2/1998 |
| EP | 0 458 665 | 4/1991 |
| EP | 0 600 198 | 6/1994 |
| FR | 2 397 298 | 2/1979 |
| FR | 2 755 065 | 10/1997 |
| GB | 737726 | 9/1955 |
| GB | 2 355 698 | 5/2001 |
| WO | WO 97/06022 | 2/1997 |
| WO | WO 98/17487 | 4/1998 |
| WO | WO 00/01548 | 1/2000 |
| WO | WO 02/20288 | 3/2002 |
| WO | 03/064192 | 8/2003 |

OTHER PUBLICATIONS

Eaton Axle and Brake Brochure and Information—1989.
Fruehauf Cargo Care and Pro Par Suspension Brochure (Prior Art).
GMC Astro-Air Suspension Brochure and Information (Prior Art).
HT Series Suspension Brochure (Prior Art).
Hutchens & Sons Suspensions Brochure (Prior Art).
Rockwell International ROR Bogie Assemblies Brochure.
United Kingdom Search Report dated Feb. 18, 2003.
International Search Report dated May 4, 2004.

* cited by examiner

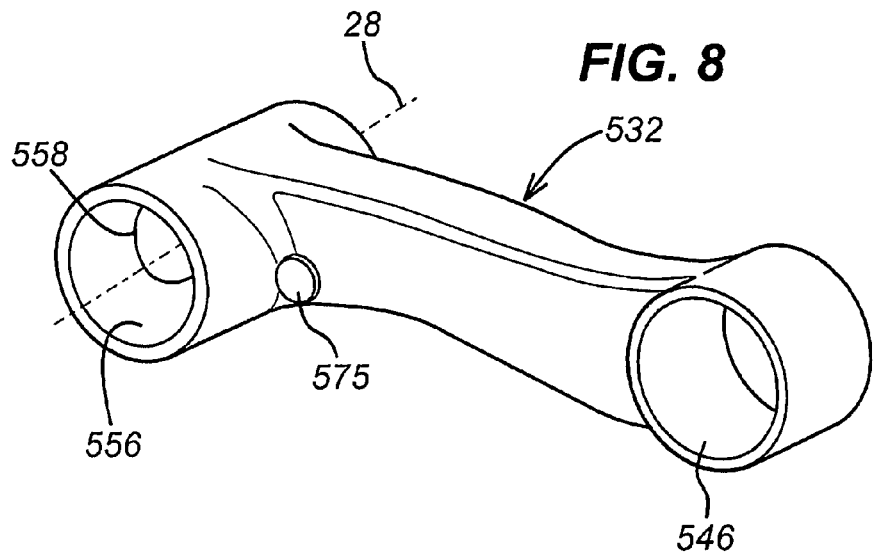
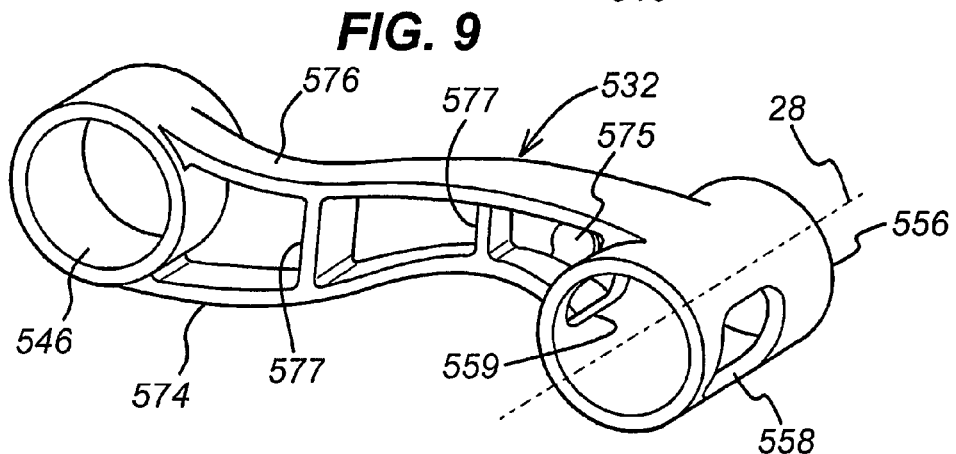
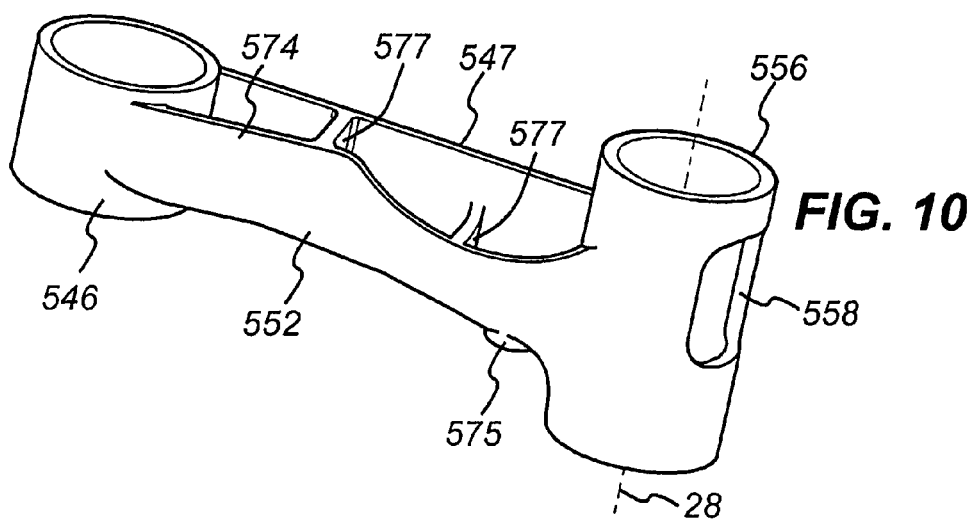

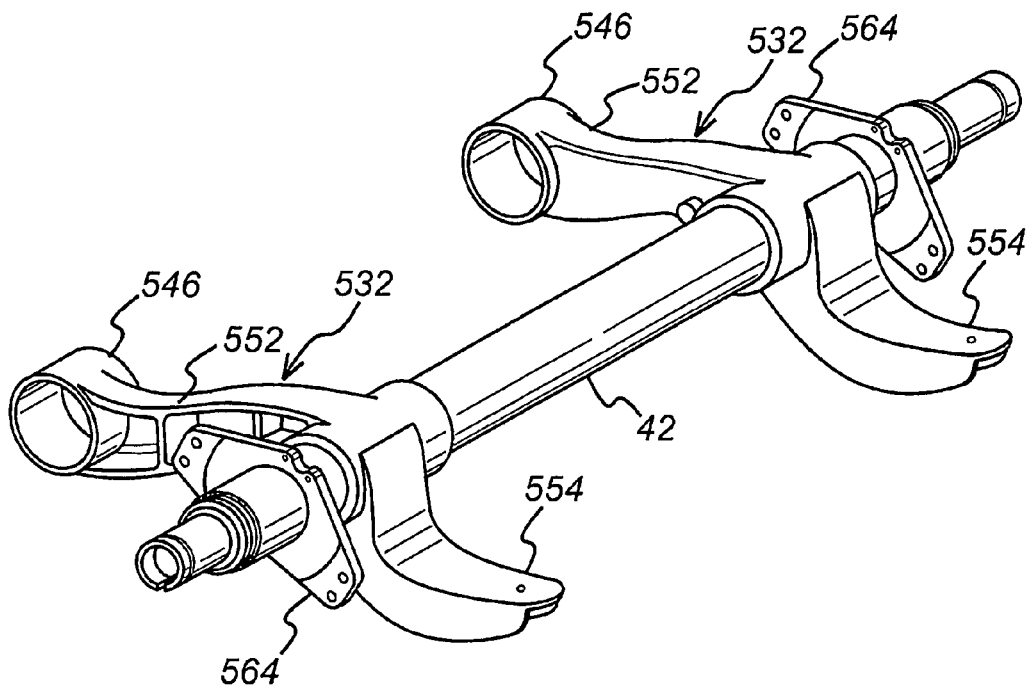
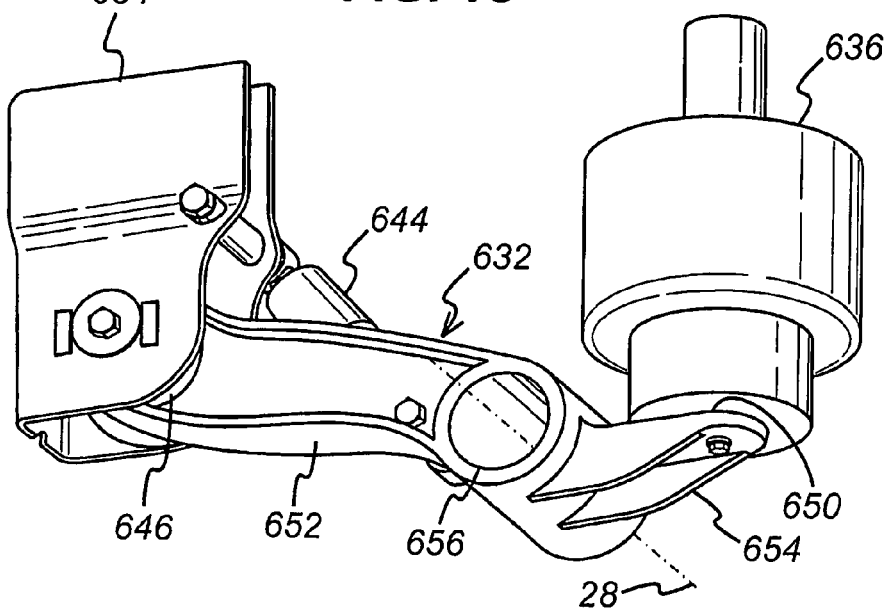

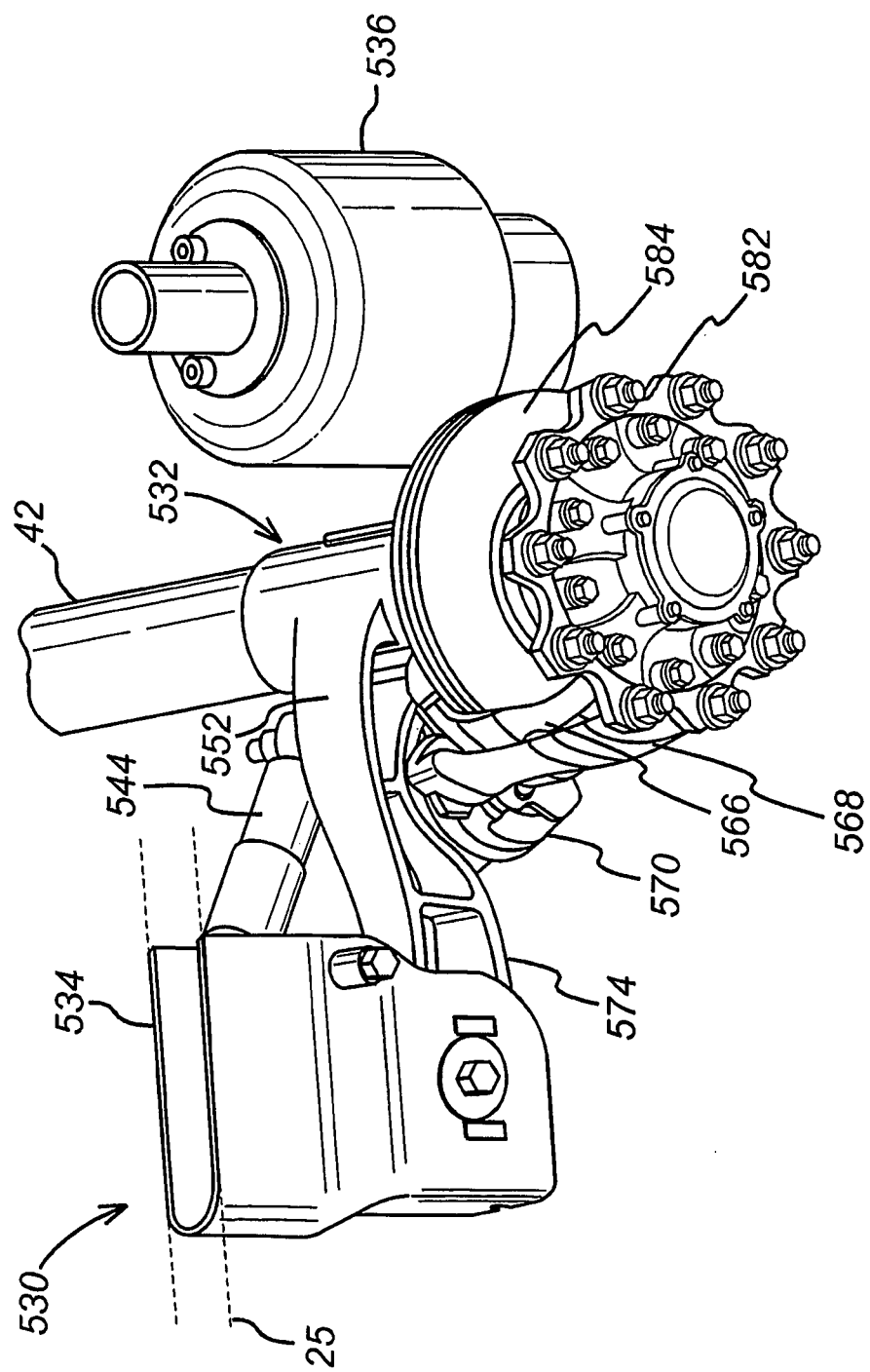

SUSPENSION TRAILING ARM

REFERENCE TO RELATED APPLICATIONS

The application claims priority to PCT Patent Application No. PCT/GB2003/005452 filed on Dec. 15, 2003, which claims priority to United Kingdom Patent Application No. GB 0229056.7 filed on Dec. 13, 2002.

BACKGROUND OF THE INVENTION

The present invention relates generally to a suspension trailing arm and a method of making a suspension trailing arm. More particularly, the present invention relates to a cast or forged suspension trailing arm, a suspension assembly incorporating a trailing arm and method of securing an axle locating feature of a suspension trailing arm to an axle.

Heavy commercial vehicles typically employ trailing arm suspension systems, particularly in relation to the axles of trailers of articulated vehicles or potentially rear axles of rigid body vehicles.

Heavy commercial vehicles (including trucks, buses and coaches) can be distinguished from light commercial vehicles (such as vans) and light passenger vehicles due to one or more of the following characteristics: 1) a laden weight in excess of approximately 3.5 tonnes and 2) the use of air actuated brakes as opposed to hydraulically actuated brakes (because air actuated brakes are better able to withstand the increased heat generated by the repeated braking of a vehicle having a weight in excess of approximately 3.5 tonnes).

Such vehicles (including trailers) also typically employ a pair of spaced parallel beams that run the length of the vehicle and act as the chassis upon which the vehicle body is mounted.

When used in heavy commercial vehicles, the trailing arms are typically pivotally mounted to chassis beams of the vehicle at the front of the arm. The trailing arm extends rearwardly (i.e., towards the rear of the vehicle) to a mounting position for the axle and then further rearwardly to a mounting surface for an air spring that is itself mounted between the trailing arm and a vehicle chassis. Axles in such vehicles are typically substantially rigid beam-type axles (i.e., axles that extend between the spindles upon which wheels at opposite sides of a vehicle are mounted). In some circumstances, the orientation of the arms may be reversed so as to pivot at the rear of the arm, in which case they are known as "leading arms." For the purposes of this specification, the term trailing arm should also be understood to encompass leading arms.

Known heavy vehicle trailing arms are typically constructed either from solid spring steel and provided with U-bolts and plates to connect an axle to the arm, fabricated steel plate which is then welded to an axle or axle adapter, or a hybrid of the two aforesaid types. An example of a fabricated trailing arm is disclosed in U.S. Pat. No. 5,639,110 (Pierce et al.). Both prior art types provide a rigid connection between the arm and the axle in order to resist bending, but have a resilient connection between the chassis and axle, either by the flexing of the spring steel trailing arm or by the flexing of a large elastomeric bush (resilient bearing) in the end of a fabricated trailing arm. This enables articulation forces induced during vehicle use to be taken up while maintaining tracking and roll stability. It has typically been considered necessary for fabricated trailing arms for use in heavy commercial vehicle applications to be manufactured having a closed box-section profile to impart sufficient strength to the arm to withstand vertical bending forces, as well forces caused by cornering, vehicle roll and travel over uneven surfaces.

Two prime disadvantages have been identified in known trailing arm designs. First, the known manufacturing techniques often place restrictions on the shape of the trailing arm, which in turn restricts the positioning of additional components that are mounted to the arms, such as brakes, air springs, dampers and pivot bushes. This may lead to the suspension packaging (i.e., its space requirement) being inefficient. Second, known types of trailing arm designs are time consuming and hence expensive to manufacture, either due to the welding or fastening of the various components that constitute the trailing arm together or due to the fastening or welding operations required to secure the trailing arm to an axle.

It is known from U.S. Pat. No. 5,203,585 (Pierce) to make a cast trailing arm type suspension for heavy vehicles. However, a separate subassembly is provided to mount the axle to the arm.

The present invention seeks to overcome, or at least mitigate, the problems of the prior art.

SUMMARY OF THE INVENTION

Accordingly, a first aspect of the present invention provides a cast or forged suspension trailing arm for suspending a heavy vehicle chassis from a beam-type axle. The trailing arm includes an integral axle locating feature.

A second aspect of the present invention provides a suspension assembly including an axle and a first trailing arm. The first arm includes an axle locating feature having first and second axle wrap portions that encircle the axle and have complementary circumferential mating faces. The faces are welded together such that no welding of the locating feature to the axle occurs at the mating faces.

A third aspect of the present invention provides a method of securing an axle locating feature of a suspension trailing arm to an axle. The locating feature includes first and second axle wrap portions. The method includes the steps of offering up the first and second axle wrap portions to the axle such that the axle is encircled and securing the axle wrap portions to the axle.

A fourth aspect of the present invention provides a cast or forged suspension trailing arm for suspending a chassis from a beam-type axle of a heavy commercial vehicle further including a bracket for the mounting of a brake or a brake part.

BRIEF DESCRIPTION OF THE DRAWINGS

Embodiments of the present invention are now described, by way of example only, with reference to the accompanying drawings in which:

FIGS. 8 to 10 are perspective views of a suspension trailing arm according to a fourth embodiment of the present invention;

FIG. 16 is a perspective view of the arms of FIGS. 14 and 15 with the rear portions of FIGS. 11, 12 and 13 secured thereto;

FIG. 17 is a perspective view of a suspension assembly including the arm of FIGS. 8 to 10;

FIG. 18 is a perspective view of a suspension assembly incorporating a trailing arm according to a fifth embodiment of the present invention;

DETAILED DESCRIPTION OF THE PREFERRED EMBODIMENT

Figure 1:
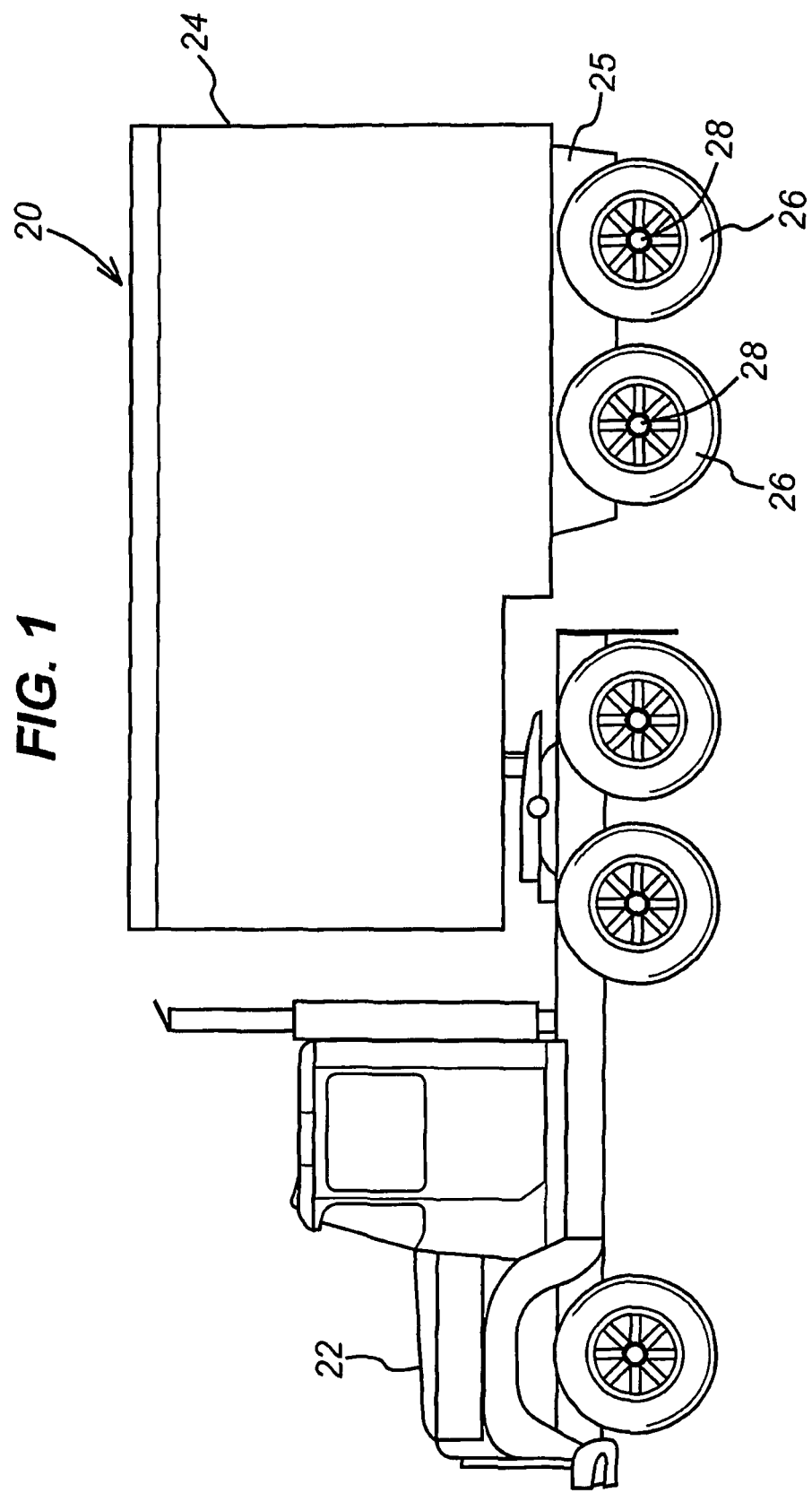
FIG. 1 is a side view of a typical heavy commercial vehicle.

FIG. 1 shows a heavy commercial vehicle 20 including a tractor portion 22 and a trailer portion 24 mounted for articulation relative to the tractor portion 22. A plurality of wheels 26 are suspended from a chassis 25 of the trailer portion 24 so that the wheels 26 rotate about axes 28.

Figure 2:
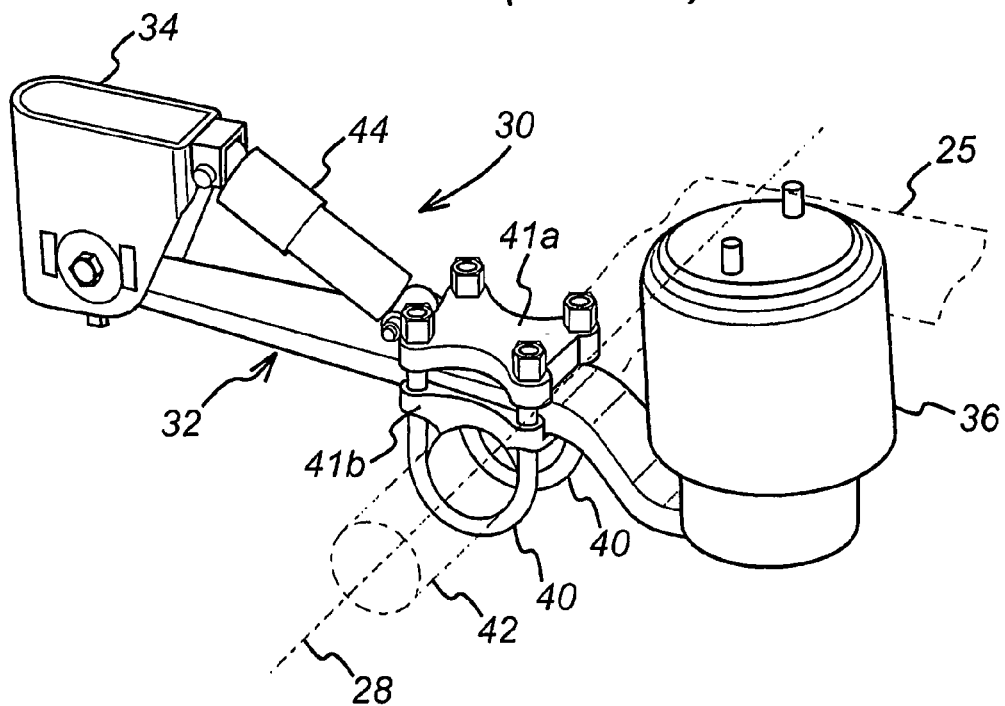
FIG. 2 is a perspective view of a prior art suspension assembly.

FIG. 2 illustrates a prior art suspension assembly 30 including a spring steel suspension arm 32, a chassis support bracket 34 and an air spring 36. The support bracket 34 and the air spring 36 provide a connection with, and suspension relative to, the trailer chassis 25 (shown in broken lines for clarity) in a known manner. U-bolts 40 and top and bottom plates 41a and 41b provide a means of mounting an axle 42 (shown in broken lines for clarity) to the suspension arm 32. In particular, it should be noted that the bottom plate 41b is welded directly to the axle 42. Wheels (not shown) are secured to each end of the axle 42 for rotation about the axis 28. A damper 44 mounted between the support bracket 34 and the U-bolt 40 and the plates 41a and 41b damps oscillations of the axle 42 relative to the chassis 25 as the vehicle 20 drives over uneven ground.

Figure 3:
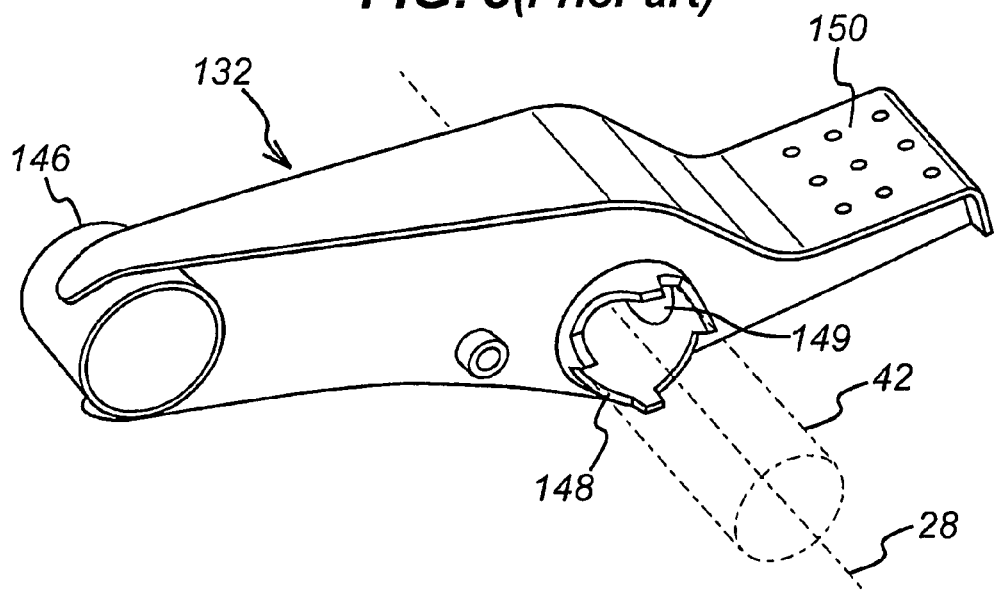
FIG. 3 is a perspective view of a prior art suspension trailing arm.

A fabricated steel trailing arm 132 of a prior art design is shown in FIG. 3 and includes a bush 146 housing a resilient bearing (not shown) to enable the arm 132 to be mounted to a chassis support bracket and an integrated axle wrap 148 to support the axle 42 of the vehicle 20. The axle wrap 148 is first welded to the axle 42 around the periphery of openings 149 (only one visible in FIG. 3, but two are present on the axle wrap 148), and the remainder of the arm 132 is then welded to the axle wrap 148. The arm 132 is further provided with a surface 150 upon which an air spring (not shown) may be mounted.

For both types of prior art trailing arms described above, a considerable amount of assembly is required and a large number of components are needed to provide a complete suspension assembly.

Figure 4A:
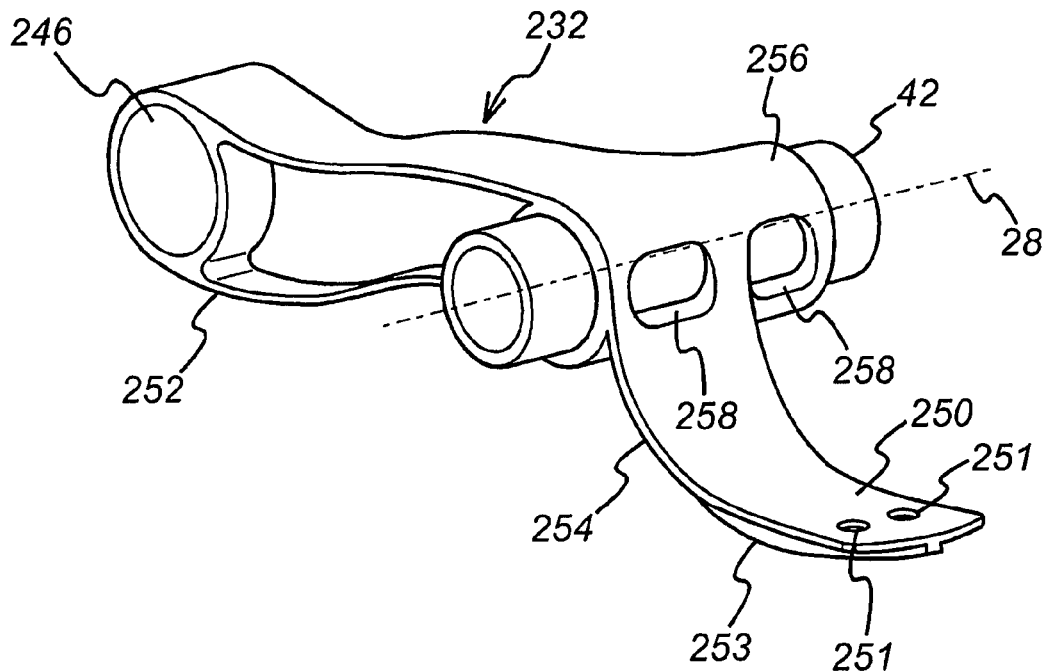
FIGS. 4A and 4B are perspective views of a suspension trailing arm according to a first embodiment of the present invention.
Figure 4B:
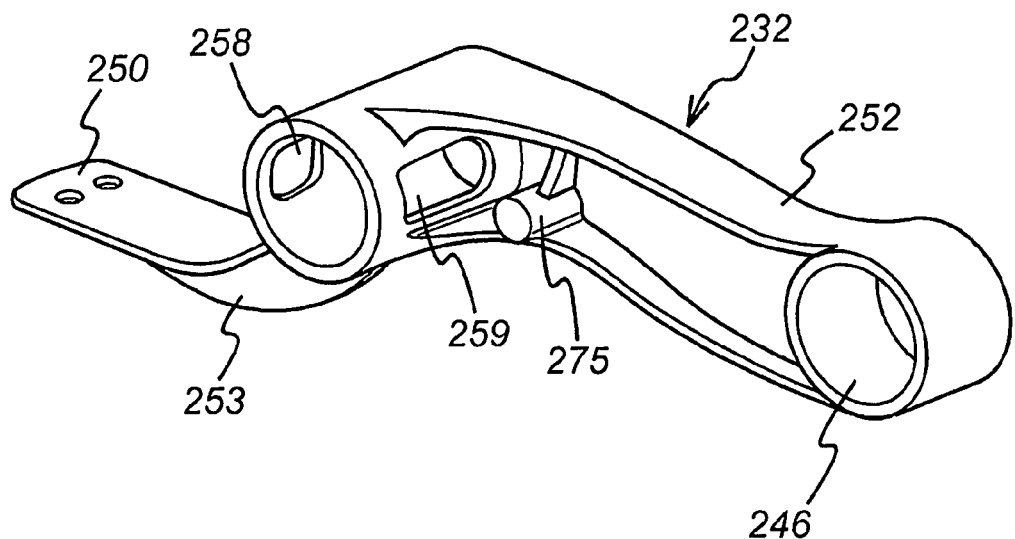

FIGS. 4A and 4B show a trailing arm 232 according to a first embodiment of the present invention to which a conventional beam-type axle 42 is mounted (FIG. 4A only). Such axles 42 are typically capable of each carrying 6 or more tonnes of payload in use. The trailing arm 232 is cast as a single piece and includes a front portion 252 and a rear portion 254 separated by an axle locating portion or feature in the form of a cast axle wrap 256 dimensioned to receive the axle 42 therethrough.

The leading end of the front portion 252 is cast so as to provide a bearing mounting 246 to receive a resilient bearing (not shown) that mounts the trailing arm 232 to a chassis support bracket (not shown) in a similar manner to the prior art.

The front portion 252 is cast between the axle wrap 256 and the bearing mounting 246 with an I-section profile to provide an optimum strength to weight ratio for the arm 232.

The rear portion 254 includes an upwardly facing substantially planar surface 250 upon which an air spring (not shown) may be received. Through holes 251 may further be provided on the surface 250 to securely locate the air spring on the surface by the use of bolts therethrough, for example. A downwardly extending web 253 may be provided therein to form a shallow T-section and impart sufficient strength to this portion of the arm 232. In other embodiments, the rear portion 254 may be an I-section or box section, for example.

Openings 258 are preferably provided in the cast wall that constitute the axle wrap 256. The openings 258 enable the axle 42 to be securely ring or fillet welded to the trailing arm 232 around the edge of the openings 258 to ensure a secure connection between the two components. A similar opening 259 is provided on the opposite side of the axle wrap 256 for a similar purpose.

The arm 232 may be made using any suitable casting or forging process and may be cast or forged from any suitable material having sufficient strength and durability properties for this particular application, such as cast iron or cast steel. One advantage of cast steel is that the weldability of the arm 232 is improved. In some embodiments, surfaces of the arm 232 are machined to provide a suitable surface finish for fitment to the axle 42 or other components or to remove any stress raising surface contours.

Figure 5A:
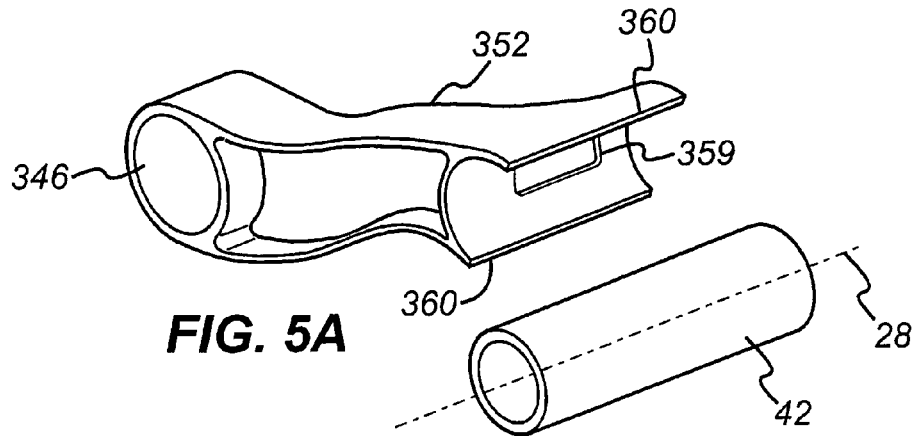
FIGS. 5A to 5C are perspective views illustrating the assembly of a suspension trailing arm according to a second embodiment of the present invention.
Figure 5B:
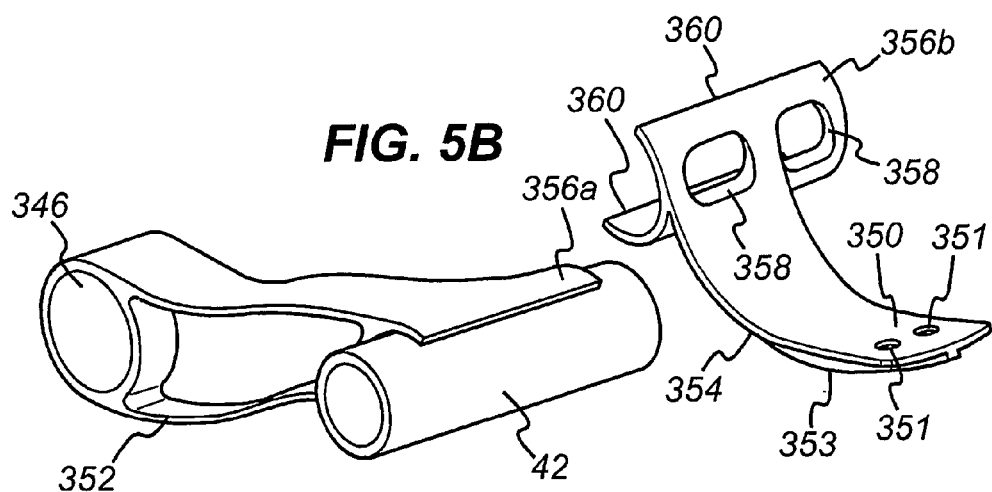
Figure 5C:
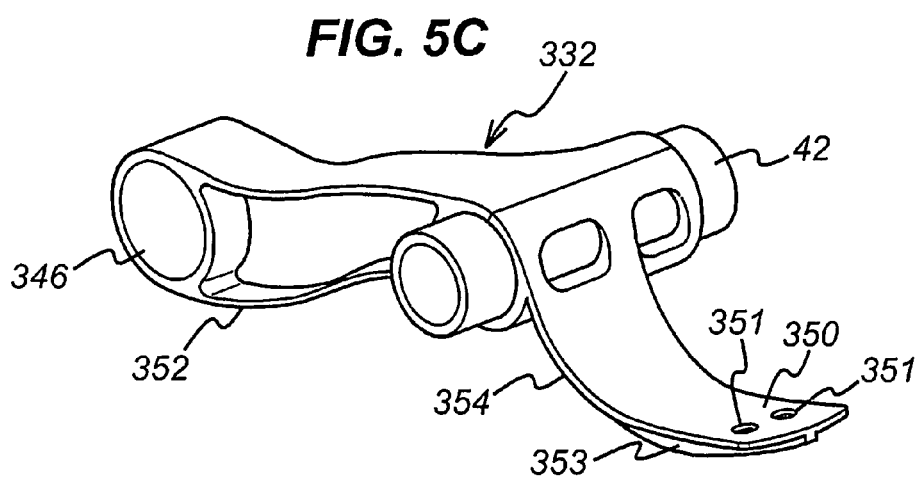

FIGS. 5A to 5C illustrate a second embodiment of the present invention in which like parts have been designated where possible by like numerals with respect to FIG. 4, but with the prefix "2" being replaced by the prefix "3." Only the differences with respect to the trailing arm 232 of the first embodiment will therefore be described in further detail.

In this embodiment, the front arm portion 352 is cast as a separate piece from the rear arm portion 354. Thus, the axle wrap is constituted from two separate wrap portions 356a (the front arm portion 352) and 356b (the rear arm portion 354). As in the first embodiment, openings or windows 358 and 359 are provided that permit each wrap portion 356a and 356b to be independently plug welded to the axle 42. It can be seen that in FIG. 5B, the front arm portion 352 is first welded to the axle 42 and is subsequently followed by the rear arm portion 354. However, in alternative embodiments, the rear arm portion 354 is welded on first, or both the front arm portion 352 and rear portion 354 are welded directly to each other along mating edges 360 prior to being welded to the axle 42. The edges 360 may be angled to provide a notch (not shown) in which the welding material may solidify. In a preferred embodiment, the front arm portion 352 and the rear arm portion 354 are welded together while in situ around the axle 42, and the welds are allowed to cool before the arm 332 is welded to the axle 42 via openings 358 and 359.

This welding method has been found to improve the durability of the connection between the arm 352 and the axle 42. In particular, it has been noted that providing the front opening 358 inboard of the web appears to be particularly effective in transmitting torsional loads induced in the axle 42 due to vehicle roll through the wrap and into the arm 332. By extending the axle wrap inboard, the contact area of the wrap with the axle 42 may be increased without interfering with the fitment of brakes and the like to the outboard end of the axle 42. In turn, this increased contact area enables the size of the openings 358 and 359 to be increased so that the length of the weld that runs around the edges of the openings 358 and 359 increases, and so does the strength of the connection.

One advantage of the arm 332 of this embodiment is that it may be simpler to cast in two parts as opposed to a single part. Furthermore, the mating of the two arm portions 352 and 354 around the axle 42 means that it is not necessary to slide the axle 42 through the axle wrap 256 for assembly, as is the case with the first embodiment.

Figure 6:
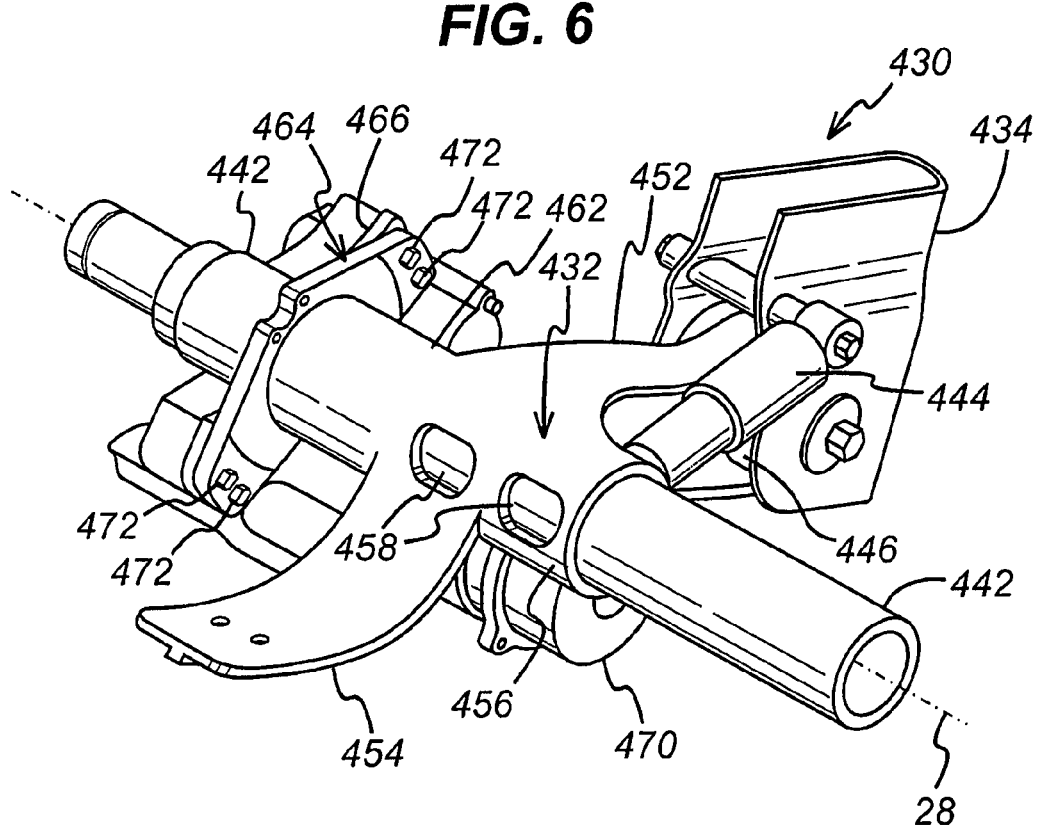
FIGS. 6 and 7 are perspective views of a suspension assembly incorporating a suspension arm according to a third embodiment of the present invention.
Figure 7:
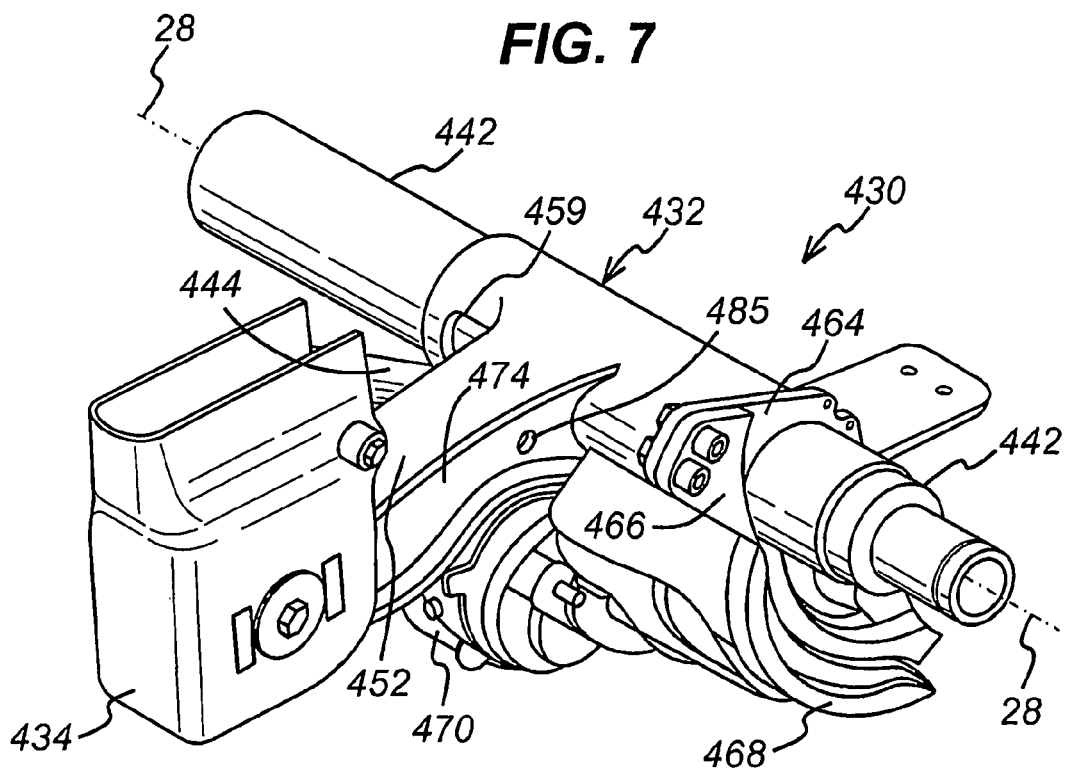

Turning now to FIGS. 6 and 7, a third embodiment of the present invention is illustrated. As before, like numerals where possible designate like parts, but with the with the prefix "3" being replaced by the prefix "4."

In this embodiment, a further variant of a trailing arm 432 is illustrated in situ in a suspension assembly 430. The arm 432 is cast as a single piece and is pivoted at its leading end to a chassis support bracket 434 by a bearing (not visible) mounted in a housing 446. A damper 444 extends between the bracket 434 and a mounting feature in the form of a mounting hole 485 provided in a front portion 452 of the arm 432.

An axle wrap 456 includes an extension 462 in a direction outwardly towards the end of the axle 442 and a bracket 464 is cast integrally therewith in a direction radially outwardly from the axle wrap 456 to enable a carrier portion 466 of a disc brake to be secured thereto by bolts 472. In turn, a floating caliper 468 of the disc brake is mounted to the carrier portion 466 for movement parallel to an axis 28, as is well known. A brake actuator 470 is secured to the caliper 468 and is arranged to float along with the caliper 468. The lower flange portion 474 of the front portion 452 of the trailing arm 432 has a raised concave lower face portion when viewed from the side to accommodate the actuator 470 and is cut away to accommodate the caliper 468 (when the friction material of the brake is worn), thus optimizing the space in the vehicle taken up by the suspension assembly and the brake.

By providing a bracket 464 for mounting a brake that is cast integrally with the trailing arm 432, the part count and assembly time of the suspension, the brake and the axle assembly may be reduced, leading to cost savings in the manufacture and assembly of a vehicle 20 to which they are fitted. Additionally, the arrangement reduces the number of components that need to be welded directly to the axle 442, thus potentially increasing its service life. Furthermore, the integration of the various parts may reduce the unsprung mass of a vehicle, leading to improvements in handling and ride comfort.

In a further development of the trailing arm 332, a brake carrier itself or part of a brake carrier may be cast integrally with the trailing arm 332, further reducing the part count of the overall assembly.

In other classes of embodiment, the bracket for mounting a brake or brake part may be secured to or formed in suspension trailing arms that are not cast. Rather, the bracket or brake part may be welded or otherwise secured to a fabricated or spring steel arm or extension thereof. For example, the axle wrap of a fabricated trailing arm may be adapted to include a bracket or brake component.

An arm 532 according to a fourth embodiment of the present invention is shown in FIGS. 8, 9 and 10 in which like numerals are designated by like parts, but with the prefix "4" being replaced with the prefix "5." The arm 532 is similar to that of the first embodiment of FIGS. 4A and 4B, except that a cast rear portion for receiving the air spring is omitted (but the axle wrap 556 is cast as a single piece and the arm 532 has a C-section profile rather than an I-section).

One advantage of using a C-section profile is that there is an increased potential to cut away a greater portion of a lower flange 574 to permit more travel of a disc brake caliper away from the wheel when the friction material of the brake is worn because the web is further inboard than for I-section profiles. In this embodiment, vertical stiffening members 577 are provided between the lower flange 574 and an upper flange 576 to improve the structural integrity of the C-section. A thickened boss 575 is also cast in the front portion that is drilled through to act as a mounting for a damper (see FIG. 17).

Figure 11:
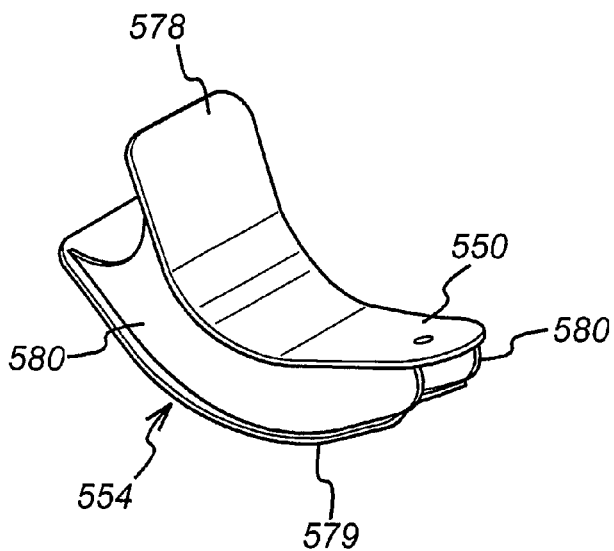
FIGS. 11 to 13 are perspective views of a rear portion for attachment to the arm of FIGS. 8 to 10.
Figure 12:
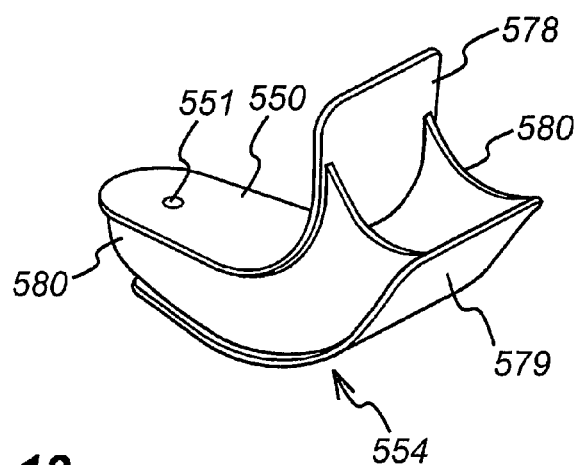
Figure 13:
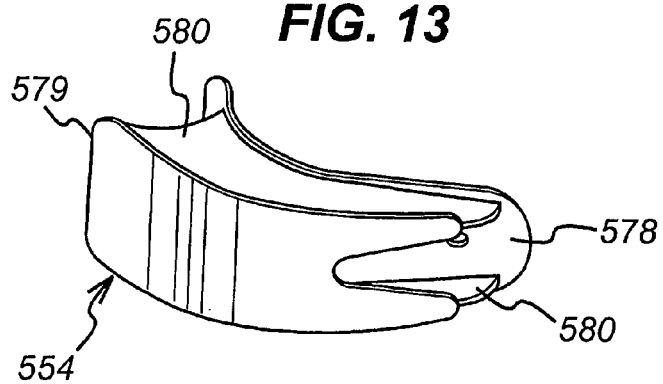
Figure 14:
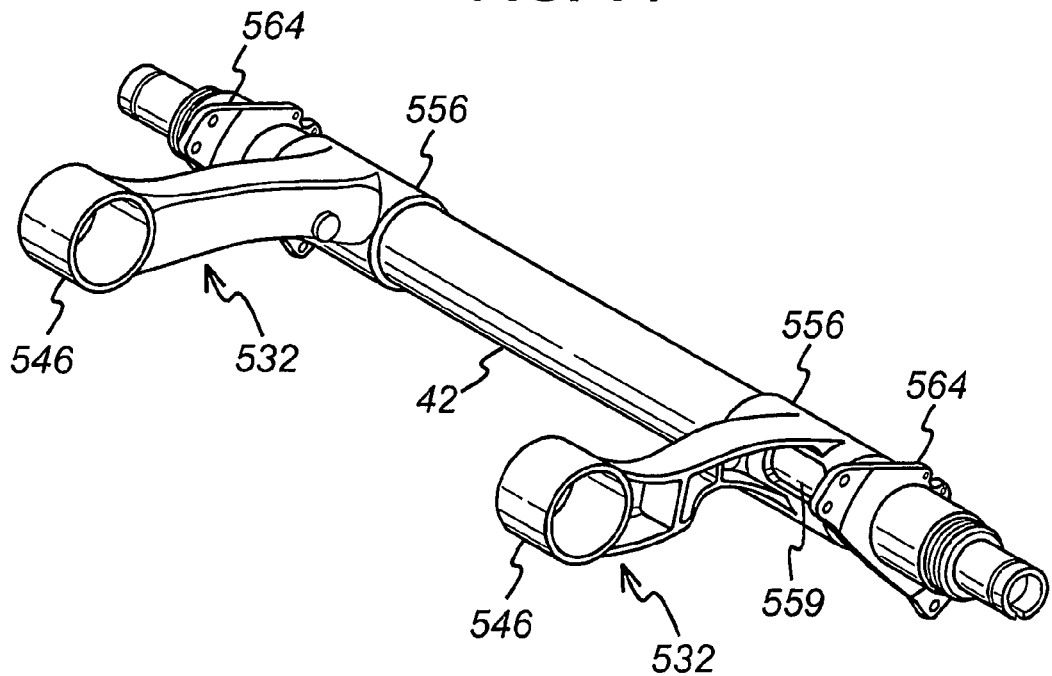
FIGS. 14 and 15 are perspective views of two arms of FIGS. 8 to 10 secured to an axle.
Figure 15:
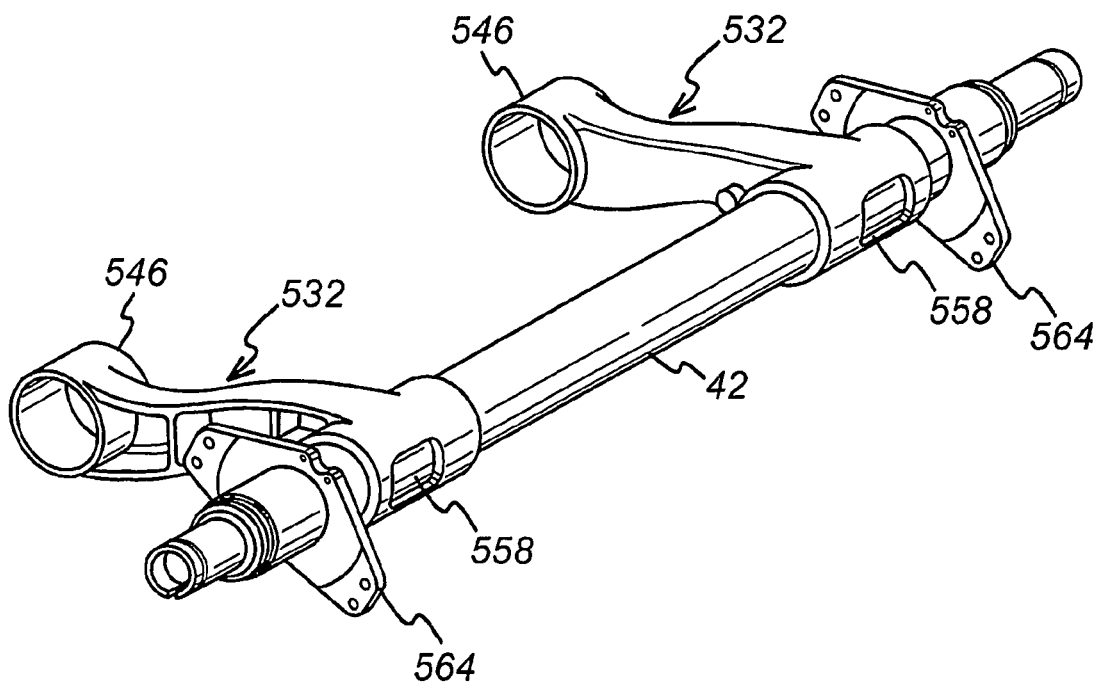

While the entire axle wrap 556 is cast integrally with the arm 532, a separate fabricated rear portion 554 as shown in FIGS. 11 to 13 is provided to be welded to the axle wrap 556 once the axle wrap 556 has been secured to the axle 42 by ring or fillet welding openings 558 and 559 (see FIGS. 15 to 17). The rear portion 554 includes upper and lower sheet portions 578 and 579 interconnected by spaced side walls 580, thereby forming a curved box section with a surface 550 arranged to receive an air spring 536 (see FIG. 20). In alternative embodiments, half of the axle wrap 556 may be cast integrally with the arm 532, with the other half being attached to the fabricated rear portion 554 as a cast or fabricated half. Other forms of fabricated rear portion 554 may be used. For example, a bottom portion 579 may be omitted or the bottom portion 579 may be fabricated to form an I or T-section, for example.

Turning to FIG. 17, one suspension assembly 530 is shown and includes the axle 42, the arm 532, a mounting bracket 534, a damper 544 mounted between the arm 532 and the mounting bracket 534, an air spring 536 and a brake carrier 566 mounted on a bracket 564 (see FIG. 16) and to which a brake caliper 568 and an actuator 570 are mounted. A front portion 552 is cranked to provide more space between it and the brake and wheel, and the actuator 570 fits within the raised portion of the lower flange 574. Space is provided by the cut out section of the lower flange 574 to accommodate the sliding of the brake caliper 568. A wheel hub 582 is rotatably mounted to the end of the axle 42, and a brake disc or rotor 584 is secured to the wheel hub 582 to be straddled and received by the brake caliper 568. The arrangement of the arm 532 provides more space for accommodating the brake caliper 568 and the actuator 570 and/or enables a narrower track wheel to be fitted to a vehicle having a standard spacing between the longitudinal chassis 25.

FIG. 18 illustrates a further embodiment of the present invention which is similar to the first embodiment of FIGS. 4A and 4B, except that a surface 650 for receiving an air spring 636 is higher relative to an axle wrap 656 and an axis 28 of the axle. This arrangement thus provides a "top mount" layout for the suspension which has a higher ride height for a given air spring compared with the first embodiment.

FIGS. 19, 20, 21, 22, 23, 24, 24A and 24B illustrate a sixth embodiment of the present invention in which like numerals where possible designate like parts, but with the prefix "7" replacing the prefix "6."

The arm of the sixth embodiment is similar in many respects to the arm of the second embodiment in that it is formed from a separate front section 752 and a rear section 754 that are joined together by transverse welds at edges 760 of a front axle wrap portion 756a and a rear axle wrap portion 756b.

Figure 20:
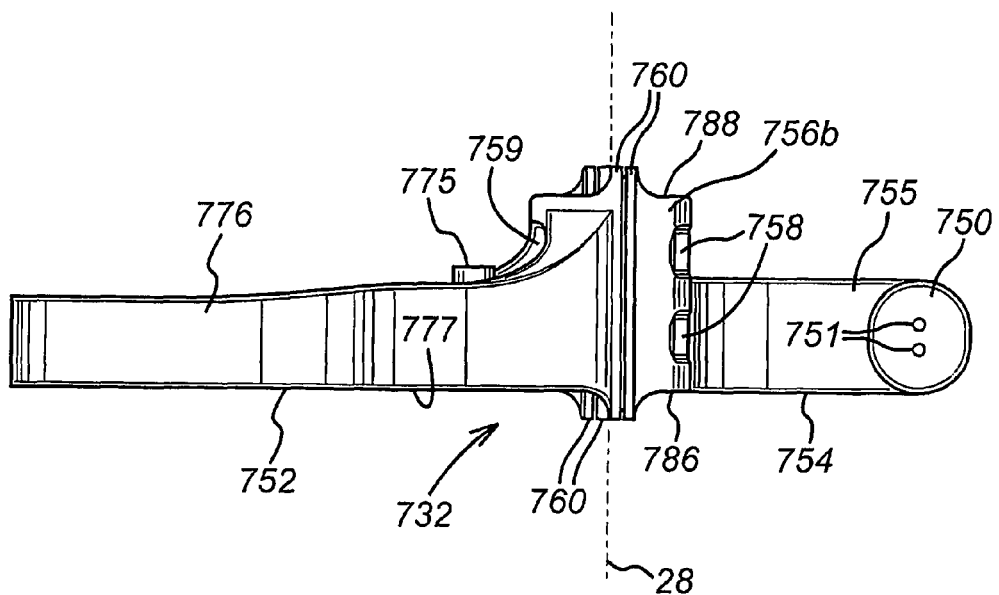
FIG. 20 is a plan view of the arm according to the sixth embodiment of the present invention.

FIG. 20 shows that both the front and rear axle wrap portions 756a and 756b are locally widened in the axial direction of the axle 42 near edges 760 so that the length of the edges 760 is greater than in the second embodiment. This provides a greater weld length between each edge surface, thereby providing a stronger join. It also means that the weld between the two edges 760 does not terminate in line with the non-widened part of the inboard and outboard sides 786 and 788 of the wrap portions 756a and 756b at a position where the stresses acting on the welds in use may be raised, thus increasing the risk of a failure in the weld. Smooth arcuate transition portions are provided between the widened portions and the non-widened portions of the outboard and inboard sides 786 and 788 of the axle wrap portions 756a and 756b.

Figure 24:
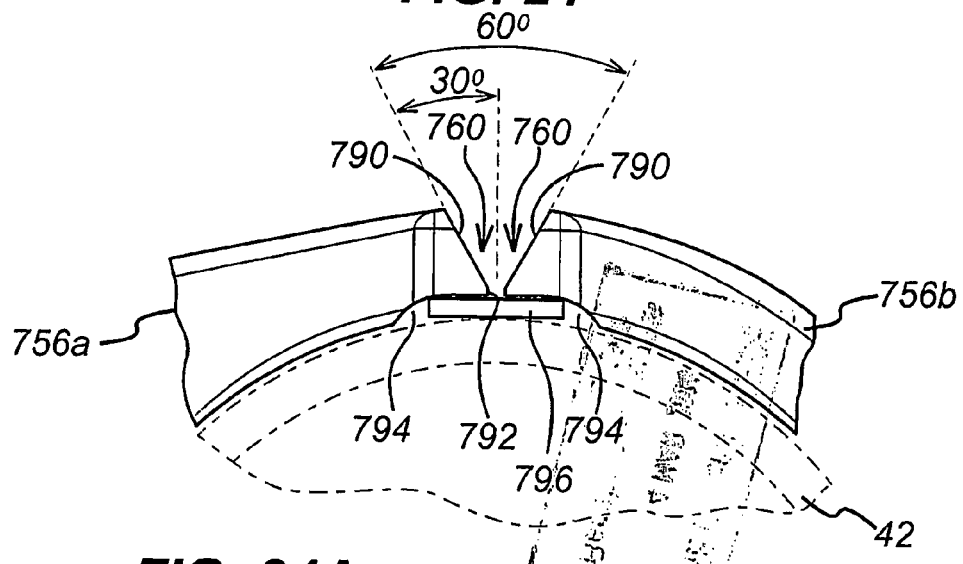
FIG. 24 is a detail view of the mating edges of the front and rear portions of the axle wrap of the arm of the sixth embodiment.

Referring in particular to FIG. 24, one edge-to-edge connection is illustrated in more detail before any welding has occurred, with both axle wrap portions 756a and 756b offered up to an axle 42. Each edge 760 has a particular profile. In this case, the profile is formed by casting the arm 732 as a single piece and subsequently machining the wrap portions 756a and 756b to give the required shape to the edges 760. In another embodiment, the front section 752 and the rear section 754 of the arm 732 may be separately cast with the edge shapes already provided therein.

Specifically, and working radially inwards, each edge 760 includes a substantially planar surface 790 angled between 10° and 50° (preferably around 30°) relative to a radius of the wrap. This surface extends approximately 8 mm radially inwardly. A further surface 792 is then provided which extends approximately 1 mm radially inwardly and is substantially parallel to a radius of the wrap. Finally, the innermost portion of the edge 760 includes an undercut portion 794 that extends circumferentially for approximately 6 mm and terminates in a curved section to provide a smooth transition to the radially innermost face of the wrap. The undercut portion 794 has a depth of approximately 3 mm. The total thickness of the axle wrap portions 756a and 756b at this region is therefore less than 20 mm, and preferably less than 50 mm. This is particularly advantageous at the top of the arm 732 since it means that the arm 732 may be used in "low mount" or low ride height applications without the arm 732 fouling on the chassis above. The thickness of the axle wrap portions 756a and 756b is preferably optimized to provided sufficient strength and stiffness without adding unnecessary weight to the arm 732.

Assembly of the front section 752 and the rear section 754 of the arm 732 around the axle 42 is as follows. The front and rear axle wrap portion 756a and 756b are offered up to the axle 42. The radius of the axle 42 and of the axle wrap portions 756a and 756b are dimensioned to provide a close fit between an outer face of the axle 42 and inner faces of the axle wrap portions 756a and 756b. This may be achieved by machining the surfaces. The external radius of the axle 42 is ideally substantially identical to the internal radius of the arm (e.g., both are 126 mm). The tolerance in the radius of each axle wrap portion 756a and 756b is preferably +0.1 mm-to 0 mm, and the tolerance in the radius of the axle 42 is preferably plus 0 mm-to 0.1 mm. In other words, the axle 42 should not be too large to fit within the axle wrap portions 756a and 756b, although a number of the advantages of the arm 732 to the axle 42 connection may still apply if the tolerance is greater. However, the axle wrap portions 756a and 756b should be dimensioned circumferentially such that there is a gap of approximately 3 mm between the opposing surfaces 792 when the axle wrap portions 756a and 756b are in place around the axle 42. Once the axle wrap portions 756a and 756b have been offered up to the axle 42, a backing strip 796 that is approximately 15 mm wide and 3 mm deep is inserted into the undercut portion 794. The backing strip 796 is preferably made from a relatively soft metal, such as mild steel or a copper alloy, and is provided to prevent subsequent welds from fusing the axle wrap portion 756a and 756b to the axle 42. The backing strip 796 has also been found to improve the integrity of the weld by giving good root fusion.

In other embodiments, the backing strip may be replaced by a lip provided on one of the wrap edges 760 that mate together, or a ceramic coating on the axle, for example.

Figure 24A:
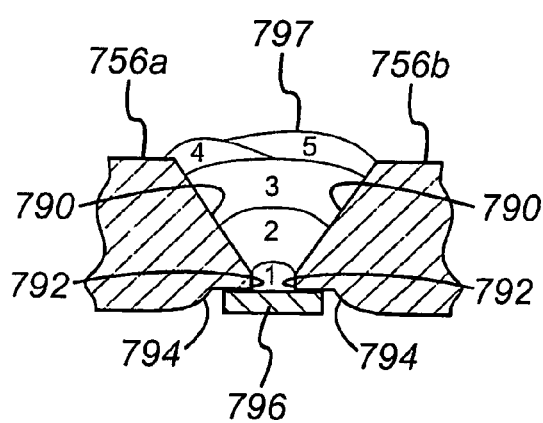
FIGS. 24A and 24B are detail cross-sectional views of the transverse and opening edge welds respectively, of the sixth embodiment.

The welding procedure is as follows. A "root pass" and first fill pass are carried out along one of the joints between the edges 760. Root passes and one or more fill passes are then carried out along the second joint until this is complete. The welding procedure may require as many as five separate passes. A completed transverse weld 797 having five passes is shown in FIG. 24A. The remaining weld passes are then completed on the first joint. The welding is preferably carried out using a metal inert gas (MIG) or a metal active gas (MAG) process and a AR20CO$_2$ shielding gas mixture using a 1.2 mm dia wire. The transverse welds are then allowed to cool naturally, which causes them to contract and pull the front and rear axle wrap portion 756a and 756b more tightly around the axle 42 such that the axle wrap portions 756a and 756b are in tension and the axle 42 is in compression.

Figure 24B:
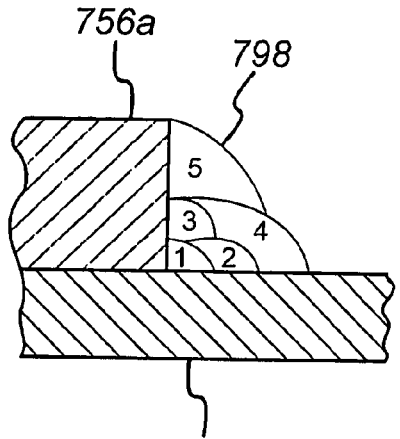

The welds around the edge of the openings 758 and 759 are then carried out by welding around the entire circumference of each edge in multiple passes (again to 5 separate passes) to weld the openings 758 and 759 to the axle 42. The circumference of each opening 758 and 759 is prepared such that there is approximately a 90° angle between the intersection of the edge of each opening 758 and 759 and the axle 42, and there is a close fit between the wrap and the axle 42 around the intersection of the edge. To enhance the durability of the welds, it is preferred that each weld run starts and finishes away from the corners of each opening 758 and 759. A cross-sectional view through a completed opening edge weld 798 is shown in FIG. 24B. The openings 758 and 759 are located close to the neutral axis of the axle 42, where bending stresses of the axle 42, in use, are at their lowest.

The welding procedure outlined above gives a particularly high strength and durable connection between the trailing arm 732 and the axle 42 when fitted to a vehicle and operated in normal circumstances. In some circumstances, it has been noted that the transverse welding causes the edges 760 of the front and rear wrap portions 756a and 756b to lift clear of the axle 42 by a small amount, which coupled with the close fit of the remainder of the axle wrap may enhance durability.

If robotic welding techniques are to be used, the number of passes required at each joint may be reduced significantly, while still providing adequate strength to the connection.

The above described wrap to axle connection may enable thinner axle tubes to be used (e.g., 11 mm rather than 13 mm) to give the required strength for each axle 42, while saving weight. These benefits are thought to have been achieved due to a combination of the positioning of the welds in the wrap, and the wrap being highly rigid and homogeneous so that it effectively distributes bending stresses and loads from the axle through the arm. The arrangement also inhibits the axle 42 bending locally around the welds due to its close fit.

Referring back to FIGS. 19, 20, 21, 22 and 23, the following additional features of the arm may be noted. The upper and lower flanges 776 and 774 of the front section 752 of the arm 732 have a tapering thickness. That is to say, the upper and lower flanges 776 and 774 are thicker closest to the axle wrap portion 756*a* than they are near the bearing mounting 746. This is because the bending stresses in the front section of the arm 732 are greatest closest to the wrap. Additionally, the width of the upper and lower flanges 776 and 774 widens towards the front axle wrap portion 756*a* for similar reasons. To improve the packaging of the arm 732 for accommodating additional components such as brake components, the outboard edges 781 and 777 of the upper and lower flanges 776 and 774 are substantially straight and at substantially 90° relative to the axis of the axle 42 and the axle locating feature (except that the lower flange edge has a recess 783 near the axle wrap portion 756*a* to accommodate a portion of the brake). At the intersection of the front portion of the arm 732 and the axle wrap portion 756*a*, there is a smooth transition such that forces generated in the wrap may be transmitted smoothly to the arm 732 without any stress raising locations being created.

Additionally, as in a number of the preceding embodiments, the lower flange 774 has a concave curved profile near the axle wrap portion 756*a* to accommodate an air actuator of a disc brake assembly.

Due to the asymmetric nature of the front section of the arm 732, the web is offset from the middle of the flanges 776 and 774 in an inboard direction at the point it intersects with the bearing mounting 746, but it intersects at 90° to the front axle wrap portion 756*a* and the bearing mounting 746.

The front portion also includes a thickened boss portion 775 that is drilled through to enable a fastener of a damper or shock absorber (not shown) to be fitted therethrough. The relative locations of the through bore 785 and the lower flange 774 may be such that the head of a fastener may be prevented from rotating when inserted into the hole due to contact with the flange, thus making fitting of a damper somewhat easier. In other embodiments, the top flange may include an integral damper mounting so that the damper may be mounted above and in line with the arm 732, or a separate mounting may be secured thereto.

Figure 19:
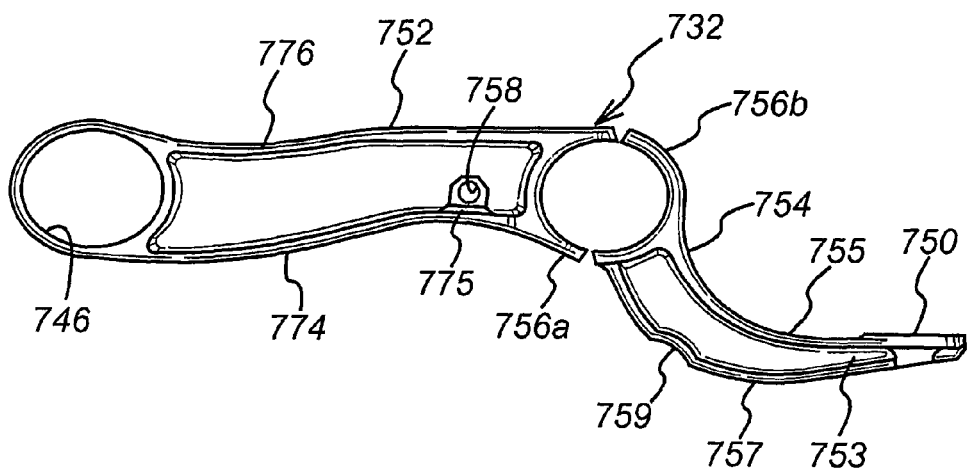
FIG. 19 is a view of an arm according to a sixth embodiment of the present invention.
Figure 21:
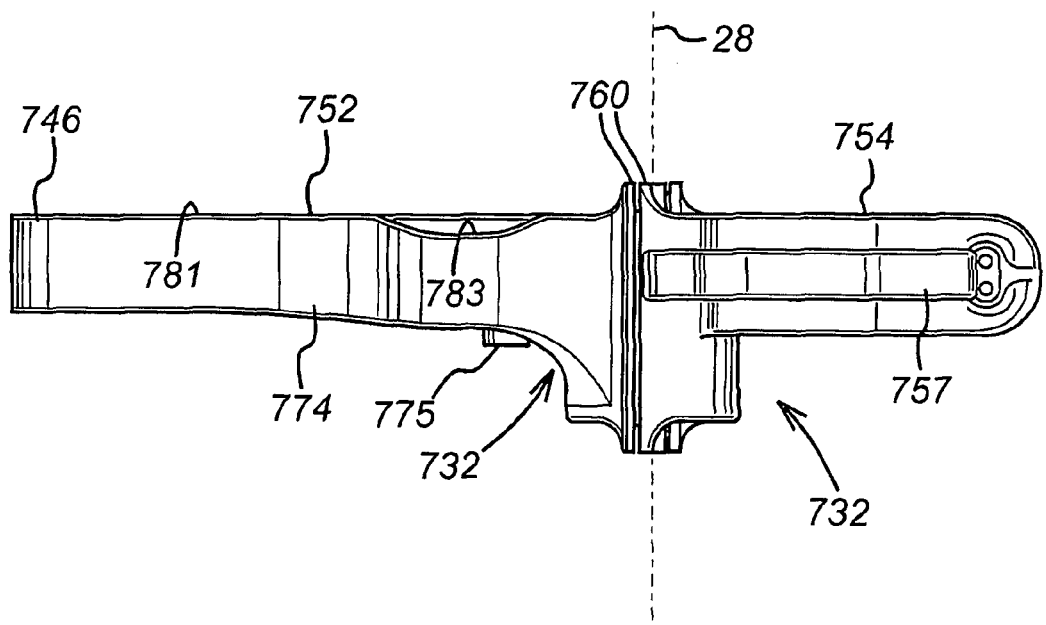
FIG. 21 is an underside view of the arm according to the sixth embodiment of the present invention.
Figure 22:
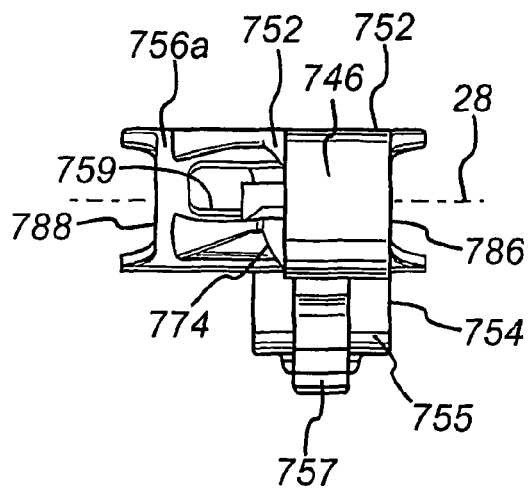
FIG. 22 is a front end view of the arm according to the sixth embodiment of the present invention.
Figure 23:
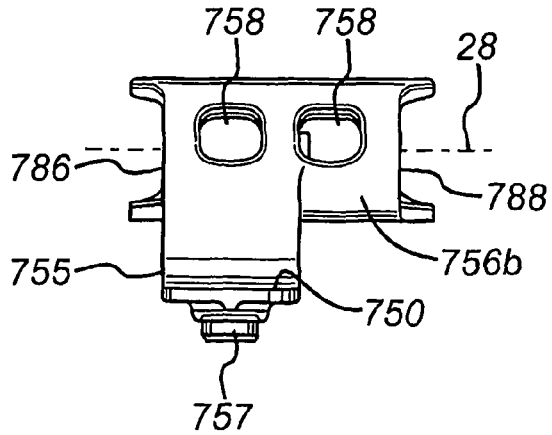
FIG. 23 is a rear end view of the arm according to the sixth embodiment of the present invention.

FIGS. 19 and 21 show the rear section 754 of the trailing arm 732 having a tapered unequal I-section profile and including a relatively wider upper flange 755 and a relatively narrower lower flange 757 with a web 753 therebetween. In this embodiment, the thickness of the flanges 755 and 757 and the depth of the web 753 progressively decrease with increasing distance from the rear axle wrap portion 756*b*. The lower flange 757 includes an opening 759 to accommodate part of a disc brake (not shown), although this may not be necessary in other embodiments. The rear section extends relatively steeply downwards from the axle wrap before levelling off at the air spring mounting surface 750. This configuration enables the trailing arm 732 to be used in "low mount" or low ride height applications. This ability is further enhanced by the minimal depth of the arm 732 (less than 20 mm) above the axle 42 so that use of the arm 732 in low mount applications is not prevented by the arm 732 fouling on the chassis 25 of the trailer portion 24 at maximum suspension travel. The air spring mounting surface is arranged so as to be substantially in line with outboard opening 758 in the rear axle wrap portion 756*b*.

Figure 25:
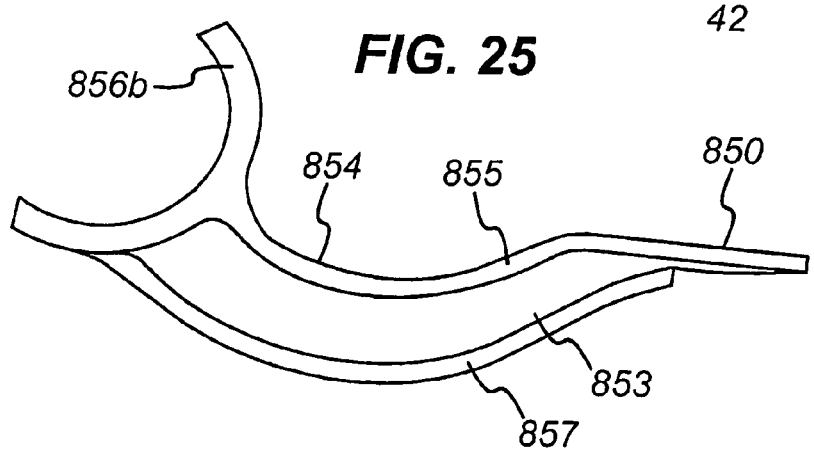
FIG. 25 is a side view of an alternative rear portion for use with the front portion of the sixth embodiment in top mount applications.

FIG. 25 illustrates an alternative rear portion 854 of the arm which is shaped such that the mounting surface 850 for the air spring is higher relative to the axle locating portion than the rear section of the embodiment of FIG. 19. As the lower flange 857 does not extend as low as flange 757, it is not necessary to provide an opening 759 therein. The rear portion 854 may be interchanged with the rear portion 754 without any adaptation been required to the front section 752 of the sixth embodiment.

The arm (not shown) provided for the opposite side of a vehicle is asymmetric with the arm described above and is essentially a mirror image of that shown in FIGS. 19 to 25 so that the various features of the arm 732 may be provided in appropriate locations. However, it should be noted that the rear sections 754 and 854 may be interchanged between opposite sides of a vehicle so that the air spring mounting surface 750 and 850 is moved inboard to allow more clearance for vehicle wheels. This is particularly applicable when the arm is to be used with dual-wheel type vehicles.

Although the forgoing description has been in relation solely to cast trailing arms having C- or I-section profiles, it is possible that these and other open section profiles (e.g., T-section profiles) may have advantages when employed in relation to fabricated or other types of trailing arm. Such profiles would require a web and at least one flange to impart sufficient strength to the arm. However, the location of the web further inboard in relation to the end of an axle to which the arm is secured in comparison with box-sections provides more room for the fitment of other components, specifically braking components. This is particularly the case if a portion of the lower flange is cut away. Furthermore, while such profiles provide sufficient tracking stability (i.e., are sufficiently resistant to lateral forces induced during cornering), they may be more compliant torsionally along their length. This means that smaller resilient bearings may be required to accommodate such torsional loads.

It should be understood that terms such as front, rear, top, bottom, inboard and outboard as used herein to describe the orientation of the various components are for illustrative purposes only and should not be construed as limiting with respect of the orientation in which the trailing arm may be fitted in a particular vehicle. Similarly, any dimensions are used for illustrative purposes only, and should not be construed as limiting, unless specifically claimed. It should be understood that the arms according to the present invention may also be used as leading arms in which the mounting bracket is arranged aft of the air spring on a vehicle.

It will further be appreciated that numerous changes may be made within the scope of the present invention. For example, the trailing arm may be provided with an integral bracket for the fitment of a drum rather than disc brakes or an integral cast drum brake component may be provided on the arm. The arm may be adapted for use with alternatives to air springs, such as coil springs for example, and may fitted to monocoque-type chassis. Additional features may be cast into the arm such as height control valve mountings and mountings for ABS and other sensors. The arm may be cast from three or more pieces should this be desirable, or if a particular design of arm necessitates further cast pieces. The cast pieces may be secured together by other means such as bolts. The bracket for mounting a brake may be non-cast (e.g., fabricated). The arm may be adapted to receive non-circular (e.g., square) axles and may mount stub as well as beam axles. The axle wrap portions of the sixth embodiment may be used in conjunction with non-cast or non-forged arms (e.g., fabricated arms). For example, the wraps may be used in the place of those disclosed in the Applicant's patent application WO02/20288.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A suspension trailing arm for suspending a heavy vehicle chassis from a beam-type axle, the suspension trailing arm comprising:
   a chassis mounting formation;
   a first cast or forged component including a first portion of an axle locating formation, and an arm portion being an integral casting or forging with the axle locating formation and extending between the first portion of the axle locating formation and the chassis mounting formation; and
   a second component comprising a second portion of the axle locating formation and a bracket for mounting a spring;
   wherein the first portion and the second portion of the axle locating formation mate together to fully encircle a portion of a beam-type axle;
wherein a thickness of the cast or forged suspension trailing arm above the axle locating formation is less than 50 mm.

2. The suspension trailing arm according to claim 1 wherein the thickness is less than 30 mm.

3. A suspension trailing arm for suspending a heavy vehicle chassis from a beam-type axle, the suspension trailing arm comprising:
   a chassis mounting formation;
   a first cast or forged component including a first portion of an axle locating formation, and an arm portion being an integral casting or forging with the axle locating formation and extending between the first portion of the axle locating formation and the chassis mounting formation; and
   a second component comprising a second portion of the axle locating formation and a bracket for mounting a spring;
   wherein the first portion and the second portion of the axle locating formation mate together to fully encircle a portion of a beam-type axle;
wherein a section of the cast or forged suspension trailing arm between the chassis mounting formation and the axle locating formation has one of a substantially I-shaped profile and a substantially C-shaped profile and includes a first flange and a second flange spaced by a web;
wherein a bending strength of the one of the substantially I-shaped profile and the substantially C-shaped profile is greater near the axle locating formation than near the chassis mounting formation.

4. The suspension trailing arm according to claim 3 wherein at least one of a flange thickness, a web thickness, a flange width and a web depth of the cast or forged suspension trailing arm is different near the axle locating information with respect to the chassis mounting formation to achieve a difference in the bending strength.

5. A suspension trailing arm for suspending a heavy vehicle chassis from a beam-type axle, the suspension trailing arm comprising:
   a chassis mounting formation;
   a first cast or forged component including a first portion of an axle locating formation, and an arm portion being an integral casting or forging with the axle locating formation and extending between the first portion of the axle locating formation and the chassis mounting formation; and
   a second component comprising a second portion of the axle locating formation and a bracket for mounting a spring;
   wherein the first portion and the second portion of the axle locating formation mate together to fully encircle a portion of a beam-type axle;
wherein the first portion of the axle locating formation includes a window aperture having a peripheral edge.

6. The suspension trailing arm according to claim 5 wherein the window aperture is located near the web and inboard of the web.

7. The suspension trailing arm according to claim 5 including a beam-type axle, wherein a weld extending around a portion of the peripheral edge of the window aperture connects the beam-type axle to the axle locating formation.

8. A suspension trailing arm for suspending a heavy vehicle chassis from a beam-type axle, the suspension trailing arm comprising:
   a chassis mounting formation;
   a first cast or forged component including a first portion of an axle locating formation, and an arm portion being an integral casting or forging with the axle locating formation and extending between the first portion of the axle locating formation and the chassis mounting formation; and
   a second component comprising a second portion of the axle locating formation and a bracket for mounting a spring;
   wherein the first portion and the second portion of the axle locating formation mate together to fully encircle a portion of a beam-type axle;
wherein the first portion of the axle locating formation is constituted by a cast or forged wall, the cast or forged wall being configured to extend further inboard than the chassis mounting formation.

9. The suspension trailing arm according to claim 8, wherein the arm portion curves inboard to provide a smooth transition into the cast or forged wall.

10. The suspension trailing arm according to claim 8, wherein a window is provided in the cast or forged wall, and the window extends further inboard than the chassis mounting formation.

* * * * *